INVENTOR
Norman George Green
BY
ATTORNEY

June 23, 1964 N. G. GREEN 3,138,666

SYNCHRONOUS REPEATERS FOR TELEGRAPH SYSTEMS

Filed Nov. 7, 1961 3 Sheets-Sheet 2

INVENTOR
Norman George Green
BY [signature]
ATTORNEY

June 23, 1964 N. G. GREEN 3,138,666

SYNCHRONOUS REPEATERS FOR TELEGRAPH SYSTEMS

Filed Nov. 7, 1961 3 Sheets-Sheet 3

INVENTOR
Norman George Green
BY Deane Hinckley
ATTORNEY

1

3,138,666
SYNCHRONOUS REPEATERS FOR TELEGRAPH SYSTEMS

Norman George Green, Taplow, England, assignor to British Telecommunications Research Limited, Taplow, England, a British company Filed Nov. 7, 1961, Ser. No. 150,688
Claims priority, application Great Britain Nov. 8, 1960
5 Claims. (Cl. 178—70)

Figure 1:
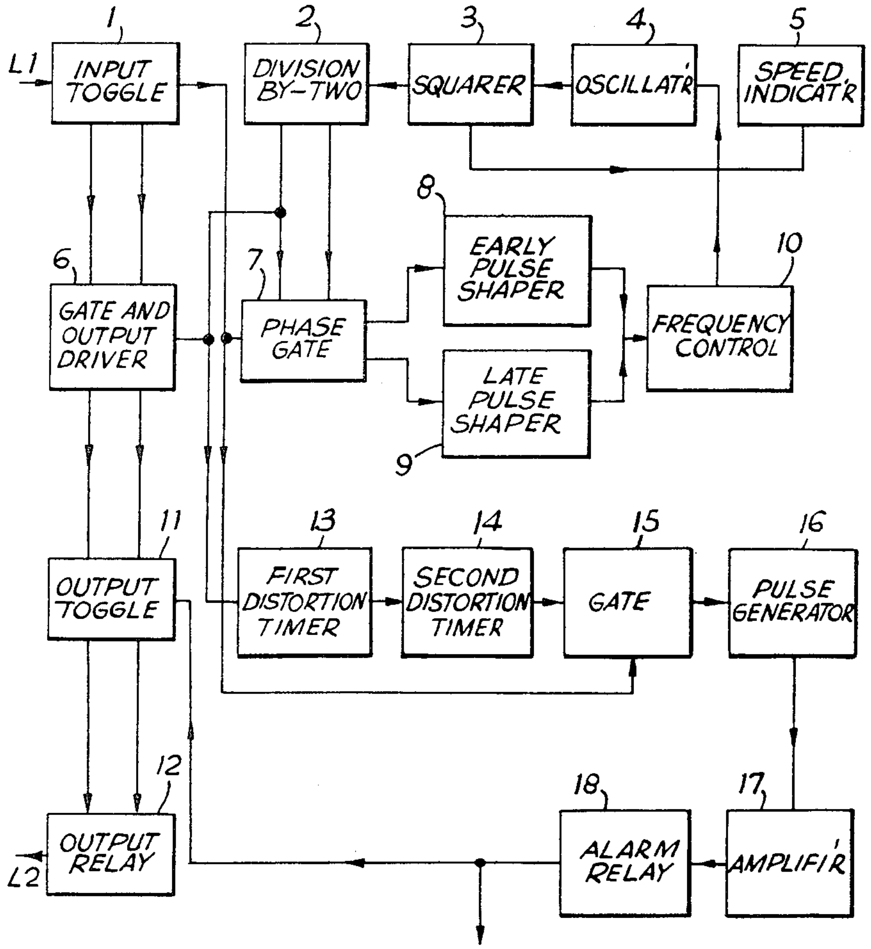

The present invention relates to synchronous repeaters for telegraph systems such as are used for regenerating a continuous series of telegraph signals, which may be transmitted over a long radio link and hence are subjet to distortion in greater or less degree. In such equipment it is usual to provide a local source of oscillation to give the necessary time base for the incoming signals and it is obviously important for successful operation that the local source should be both in synchronism and in phase with the incoming signals. In spite of the use of crystal oscillators, possibly with close temperature control, it is not economically possible to ensure that exact synchronism will be maintained between the sending and receiving stations if there has been an appreciable break in transmission. Accordingly arrangements are usually provided for making small changes in the appropriate local oscillation frequency, preferably at one of the divider stages which are necessary with a comparatively high frequency crystal. The object of the present invention is to provide a simpler and cheaper arrangement which avoids the necessity for the use of a crystal.

According to the invention, use is made of a pulse source which is not of high stability and arrangements are provided for bringing about fast correction when it is established that the local source is not in phase with the incoming signals.

Preferably the local source is an audio-frequency oscillator and may have a frequency of only four times the baud speed and such an oscillator is very much cheaper and more compact than a crystal oscillator and moreover offers advantages in regard to flexibility. Thus with such an oscillator it is readily possible to arrange for frequency correction on a continuous biasis rather than in discrete steps and moreover there is no serious difficulty in changing the basic frequency which may well be desirable in some cases, particularly where the repeater is being used for monitoring. Furthermore owing to the fact that a much lower basic frequency is being employed, the number of dividers necessary to produce the incoming signal frequency is considerably reduced or alternatively simpler dividers may be used, for instance it may be entirely satisfactory to use only a single divider which merely divides by two.

According to a subsidiary feature of the invention, it is arranged that the repeater incorporates a distortion monitor, the effect of which is to produce a switching operation if the incoming siganls are so badly distorted that the repeater cannot deal with them successfully. In one form this may involve a complete termination of the repeating operation, that is to say the repeater sends forward a continuous mark signal, or alternatively or in addition the distorition monitor could be arranged to give an alarm so that the operator would realise that the circuit had become unworkable and would take steps to change the frequency or otherwise improve the operation.

It will be appreciated that a synchronous repeater only deals with a continuous series of binary terms and that synchronisation is derived from the reversals which take place. No facilities exist at the repeater for deciding how the succession of signals is divided up into characters and the operator has no means of deciding therefore whether the repeater is re-transmitting characters which

2 make a satisfactory message or whether owing to defects in transmission the succession of characters is quite meaningless. In any event the messages could well be in code so that the operator would not know whether they were being transmitted satisfactorily. It is for this reason that the use of a distortion monitor in these circumstances involves considerable advantages.

In one form of carrying the invention into effect use may be made of a correcting arrangement by means of which it is possible to control the oscillator satisfactorily in accordance with the state of charge of a capacitor so that continuous correction can be obtained rather than correction in discrete steps. The exact form of the distortion monitor is not important and use may be made of a device similar to that disclosed in Day Patent No. 2,985,716 granted May 23, 1961.

Figure 2:
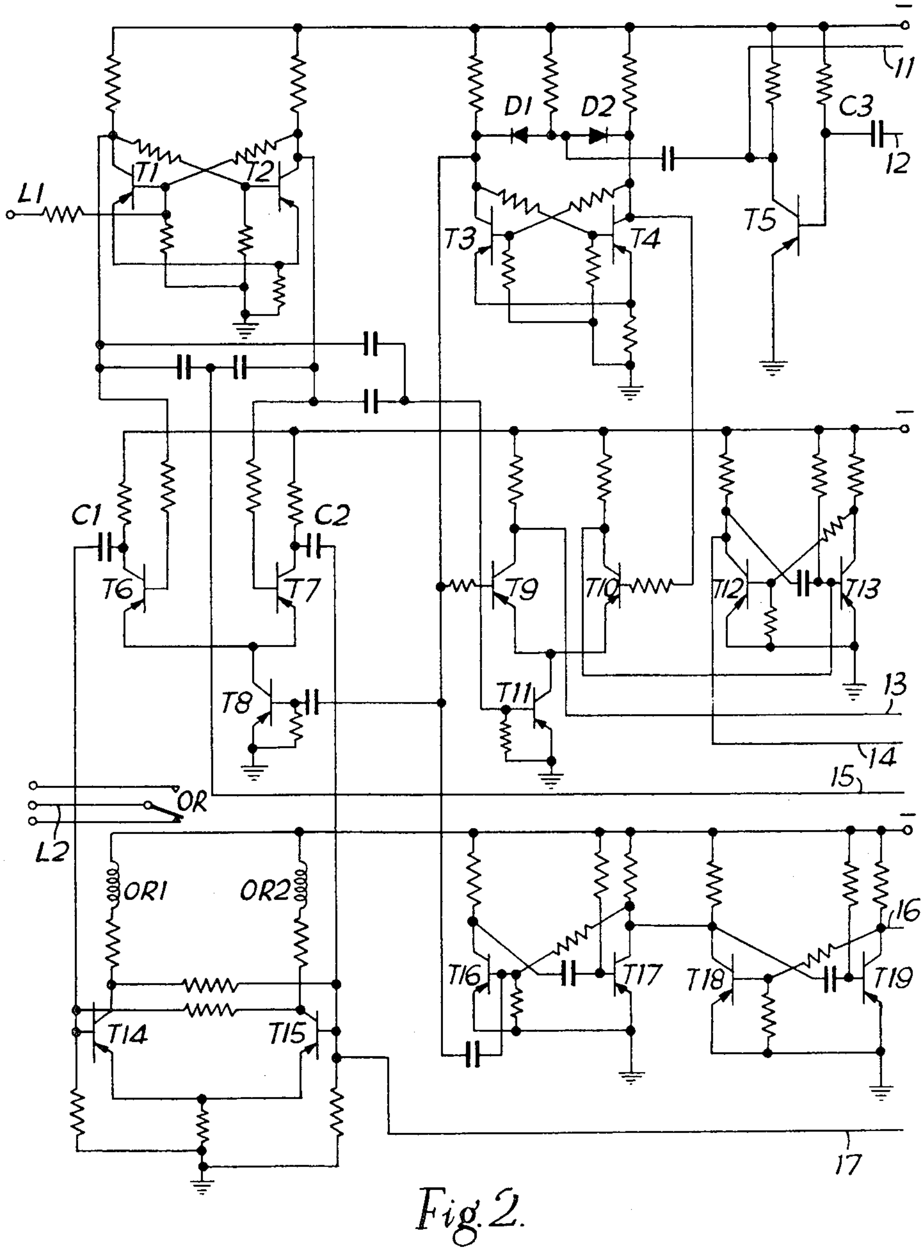
Figure 3:
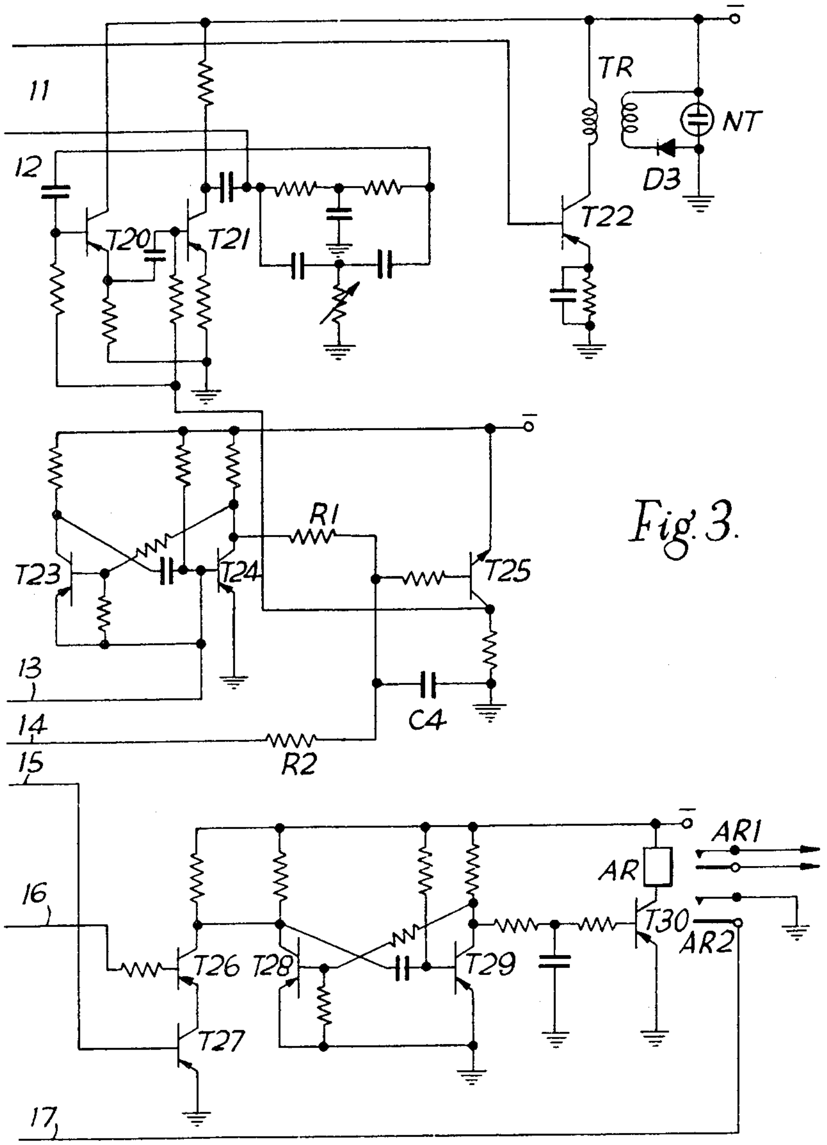

The invention will be better understood from the following description of one method of carrying it into effect which is given by way of example and should be taken in conjunction with the accompanying drawings comprising FIGURES 1–3. Of these, FIGURE 1 is a block schematic showing the functional purpose of the various units, while FIGURES 2 and 3, which should be placed side-by-side with FIGURE 2 on the left, show detailed circuits of the blocks indicated in FIGURE 1.

The incoming signal arriving over the line L1 serves to set the input toggle 1 from which an output is applied to the gate circuit and output driver 6 which is controlled by the local oscillator in such a manner that the incoming signals are sampled at what is nominally their middle point. The output driver sets the output toggle 11 in accordance with the sample and this toggle controls the output relay 12 which by means of its contacts transmits a suitably regenerated signal over the outgoing line L2.

The local pulse source is assumed to be an audio-frequency oscillator 4 which serves to produce a reasonably pure sine wave. This is fed to a squarer 3 and thence to a division-by-two circuit 2 by which the frequency is halved. A substantially square output is obtained from the circuit 2 and this is supplied to the phase gate 7 which also receives a control from the input toggle 1. The effect of the phase gate 7 is to make a comparison between the pulses received from the two sources and two alternative outputs are obtained according as the local pulses are early or late compared with the incoming signals, assuming that some phase difference exists. These two alternative outputs are fed respectively to the early pulse shaper 8 and the late pulse shaper 9 the function of which is to derive reasonably square pulses of constant length from the short pulses received from the phase gate. At any particular time an output will be obtained from only one of these circuits 8 and 9 and in accordance therewith a variable potential is fed to the integrator and frequency control unit 10, by means of which a steady but variable potential is supplied to the oscillator 4 to adjust its frequency.

One of the outputs from the division-by-two circuit 2 is also applied to the distortion monitor timing circuit 13 which has the effect of timing a predetermined delay period by producing a pulse which is fed to the similar circuit 14. The trailing edge of this pulse trips the circuit 14 to produce a similar pulse of predetermined length. This is supplied to gate 15 and is effective in conjunction with a control from the input toggle 1. The delay is adjusted so that if the maximum amount of distortion which the regenerator can handle is exceeded, an output is obtained through the gate 15 so as to supply an input to the pulse generator 16 which then produces a lengthened pulse. It is arranged that a sufficient number of such pulses serve to operate the alarm relay 18 by way of the amplifier 17. The relay 18 may then operate an alarm to call attention to the deterioration of the circuit and/or control the output toggle 11 so as to inhibit any further transmission over the output circuit.

The circuit may also conveniently include a speed indicator 5 which is driven from the squarer 3 so as to give a visual indication, for instance on a neon tube, of the frequency of the local oscillator.

Considering now the detailed circuits of FIGURES 2 and 3, these employ transistors in the various pieces of equipment and the units consist for the most part of toggle circuits which are basically of the Eccles-Jordan type or of single-shot multivibrators. The input toggle comprises a basic Eccles-Jordan circuit consisting of the transistors T1 and T2 having their bases and collectors cross-connected in known manner. The incoming signal over line L1 is applied to the base of transistor T1 and according to the potential on the lead L1 depending on the nature of the signals, one or other of the transistors T1 or T2 is conducting. Accordingly, of the two control leads extending from the collectors, one has a higher potential than the other depending on which transistor is conducting. These output leads extend to the bases of transistors T6 and T7 which together constitute the output driver. A further transistor T8 is connected in circuit with the emitters of the transistors T6 and T7 and this is controlled from the local oscillator so as to produce the necessary gating action. For this purpose one of the output leads from the division-by-two circuit comprising transistors T3 and T4 is applied to the base of transistor T8 and this produces the sampling effect which is nominally at the middle of each signal element. Connections from the collectors of transistors T6 and T7 extend by way of capacitors C1 and C2 to the bases of transistors T14 and T15 respectively and cause one or other of these transistors to conduct and to remain conducting for full signal element length so as to produce the desired regenerating effect. The output relay, which is of the polarised type, has coils OR1 and OR2 respectively connected in the collector circuits of transistors T14 and T15 and according to which transistor is conducting contacts OR connected to the outgoing line L2 occupy one or the other of their alternative positions.

Considering now the audi-frequency oscillator which forms the local pulse source, details of this are shown in FIGURE 3 and it will be seen that it consists of a two-stage oscillator comprising transistors T20 and T21 with feedback from the collector of T21 to the base of T20 by way of a suitable R–C network. The output, which is substantially sine wave, is taken from the collector of T21 and extends by way of lead 12 and capacitor C3 to the base of the transistor T5 forming the squaring circuit. This produces pulses having a sharp leading edge which are applied to the division-by-two circuit which again is basically an Eccles-Jordan toggle. The input is applied to the two halves of the circuit by way of the back-to-back diodes D1 and D2 and the result is that the toggle reverses in response to each input pulse. Consequently the frequency of the output obtained from each side of the toggle will be half the frequency of the incoming pulses. These outputs are applied to the bases of the transistors T9 and T10 forming the phase gate. This gate is similar to the gate used for sampling in the main signalling circuit and as in that circuit makes use of a transistor T11 in the emitter circuits of the transistors T9 and T10. The base of the transistor T11 receives a pulse from the input toggle each time this reverses in response to the incoming signals. Since the potentials connected to the bases of transistors T9 and T10 can never be the same since they are obtained from opposite halves of the division-by-two circuit, only one of these transistors will conduct during the short pulse obtained from the input toggle and the relative phases of the local and input signals will determine which it is to be. The early pulse shaper, FIGURE 2, including transistors T12 and T13 and the late pulse shaper, FIGURE 3, including transistors T23 and T24 are both monostable multivibrators of conventional type and they are fed respectively from the collectors of the transistors T10 and T9, the latter over lead 13. These pulse shapers produce squared pulses of standard length, which are applied respectively to the potential divider comprising the resistors R1 and R2, the pulse from T12 extending over lead 14. To the junction of these resistors is connected an integrating capacitor C4 and the effect is that dependent on whether pulses are received from the early pulse shaper or the late pulse shaper, the potential applied to the base of the transistor T25 will vary. This transistor is of the n-p-n type while all the others as shown are of the p-n-p type and an output is taken from its collector which is applied to the bases of the transistors T20 and T21 forming the oscillator. Variation of this potential serves to vary the frequency of the oscillator and it is arranged that this variation takes place in the direction to bring it rapidly into synchronism and phase with the incoming signals.

Considering now the arrangements for distortion monitoring, these include two distortion timers for providing the necessary delay. Each of these is a monostable multivibrator similar to the early and late pulse shapers and the first comprises the transistors T16 and T17 while the second similarly comprises transistors T18 and T19. The output from the division-by-two circuit which is applied to the base of the transistor T8 to control the gate in the main signalling circuit is also applied to the first distortion timer. This output may be thought of as negative-going pulses separated by intervals of the same length as the pulses and the leading edge of each pulse changes over the first distortion timer which resets after its delay period. Thereupon it changes over the second distortion timer which then resets after its delay period. The corresponding output is connected over lead 16 to the gate circuit consisting of transistors T26 and T27 in series. T26 is controlled by the delay output from the local oscillator i.e. the output from the collector of T19 while T27 is controlled from the input toggle and receives a pulse over lead 15 each time this toggle changes over. The delay periods of the two distortion timers are adjusted so that transistors T26 and T27 will only both conduct if distortion has reached a value at which transmission over the circuit will be unreliable. In this case a pulse from the input toggle will occur during the set period of the second distortion timer and an output is obtained from the collector circuit of T26. This is applied to the pulse generator which again comprises a monostable multivibrator consisting of transistors T28 and T29. This produces pulses which are integrated by the capacitor C5 so that if conditions persist, transistor T30 conducts and thus operates the alarm relay AR connected in its collector circuit. This relay is shown provided with two sets of contacts of which AR1 are arranged to operate an alarm while contacts AR2 by connecting earth to the base of transistor T15 over lead 17 prevent the output toggle changing over and thus transmit a continuous mark signal over the line L2.

The speed indicator shown in the upper portion of FIGURE 3 is operated from the output of the squarer over lead 11 which extends to the base of the transistor T22. This includes in its collector circuit a transformer TR the secondary of which is connected to the neon tube NT by way of the diode D3. The effect of this arrangement is that the tube flashes in synchronism with the pulses produced by the squarer and thus gives a visual indication of the speed of operation of the local oscillator.

I claim:

1. In a synchronous repeater for a telegraph system, means responsive to incoming signals, a local pulse source comprising a two-stage oscillator each stage of which includes a transistor, a division-by-two circuit connected to said local pulse source and having two output leads which are energised alternately in response to successive pulses from said local source, a pair of transistors each having base, emitter and collector electrodes, a third transistor having base, emitter and collector electrodes, connections from the output leads of said division-by-two circuit extending respectively to the base electrodes of said pair of transistors, connections from the emitters of said pair of transistors to the collector of said third transistor, a connection from said incoming signal responsive means to the base of said third transistor, a first control lead connected to the collector of one of said pair of transistors, a second control lead connected to the collector of the other of said pair of transistors, whereby said third transistor controls the connection of potential to either said first or said second control lead dependent on the phase relationship between said incoming signals and pulses from said local source, a potential divider connected across said first and second control leads and a tapping on said potential divider providing a potential for controlling the frequency of said local source.

2. In a synchronous repeater for a telegraph system, means responsive to incoming signals, a local pulse source comprising a two-stage oscillator each stage of which includes a transistor having base, emitter and collector electrodes, the collector of said second stage transistor being connected to the base of said first stage transistor, a comparator for comparing the phase of said incoming signals with the phase of oscillations produced by said local source, a first control lead, a second control lead, means in said comparator for connecting potential to said first control lead if the local pulses are ahead of said incoming signals and to said second control lead if the local pulses are behind said incoming signals, a potential divider connected across said first and second control leads, a tapping on said potential divider providing a variable potential dependent on the potentials on said first and second control leads respectively, and means for applying said variable potential to the bases of said first and second stage transistors in said oscillator to control the frequency of oscillation thereof.

3. In a synchronous repeater for a telegraph system, means responsive to incoming signals, a local pulse source, a delay device controlled from said local source, a gate jointly controlled by the output from said delay device and said incoming signal responsive means whereby said gate is only opened if said signals involve a predetermined minimum degree of distortion, a relay, means for operating said relay when an output is obtained from said gate, and means controlled by said relay when operated for giving an alarm.

4. In a synchronous repeater for a telegraph system, means responsive to incoming signals, a local pulse source, a delay device controlled from said local source, a gate jointly controlled by the output from said delay device and said incoming signal responsive means whereby said gate is only opened if said signals involve a predetermined minimum degree of distortion, a relay, means for operating said relay when an output is obtained from said gate, and means controlled by said relay when operated for preventing incoming signals from being repeated.

5. In a synchronous repeater for a telegraph system, means responsive to incoming signals, a local pulse source comprising a two-stage oscillator each stage of which includes a transistor, a division-by-two circuit connected to said local pulse source and having first and second output leads which are energised alternately in response to successive pulses from said local source, a first control circuit, a second control circuit, a gate circuit controlled by said incoming signal responsive means for operating said first control circuit or said second control circuit dependent on whether said first or said second output lead is energised when control is exerted by said incoming signal responsive means, means for altering the frequency of said oscillator in one sense when said first control circuit is operated and means for altering the frequency of said oscillator in the other sense when said second control circuit is operated.

References Cited in the file of this patent

UNITED STATES PATENTS

| | | |
|---|---|---|
| 2,597,071 | Cory | May 20, 1952 |
| 2,931,860 | Cookingham | Apr. 5, 1960 |
| 2,981,796 | De Lange | Apr. 25, 1961 |

OTHER REFERENCES

Textbook: "Electronic and Radio Engineering," by F. E. Terman; McGraw-Hill Book Co., Inc., New York; Fourth Edition; pages 650, 997 and 998.